United States Patent Office 3,320,967
Patented May 23, 1967

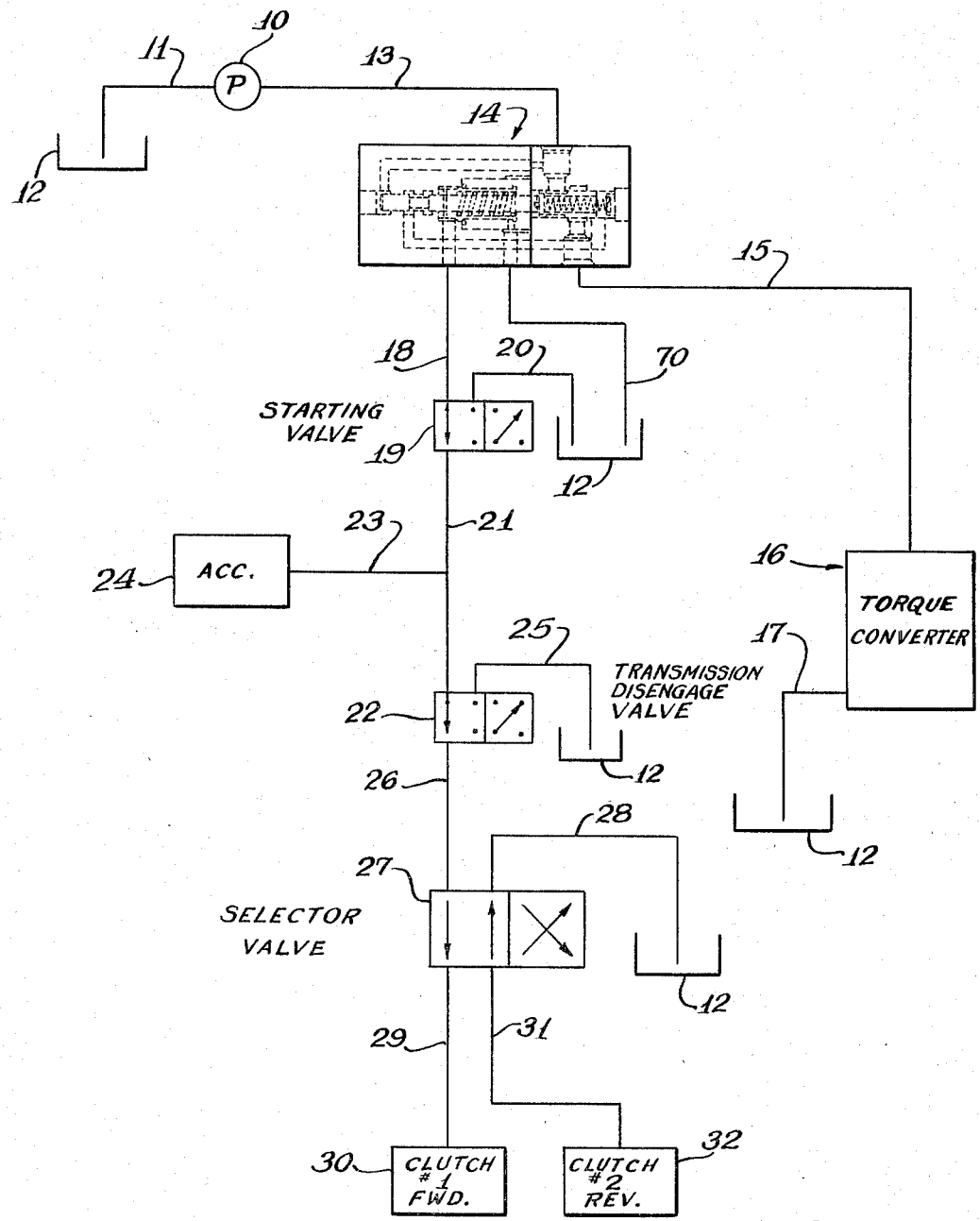

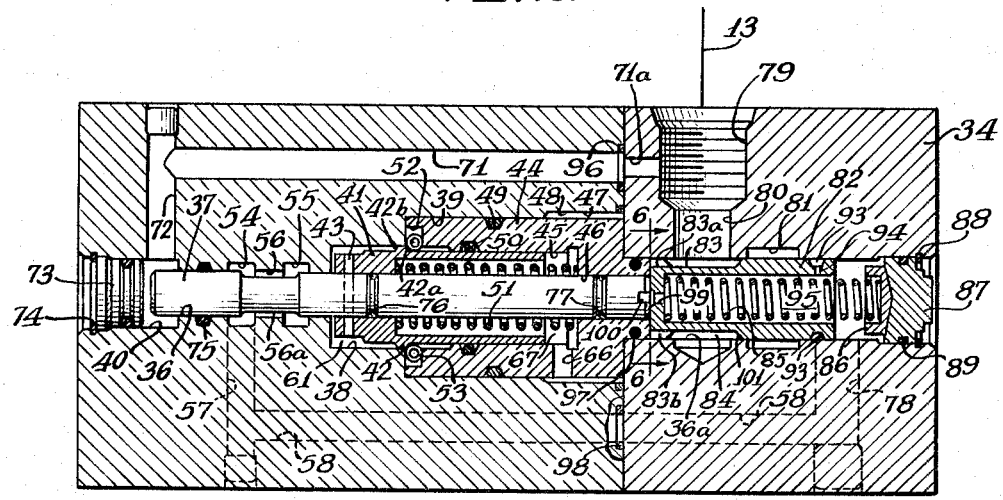
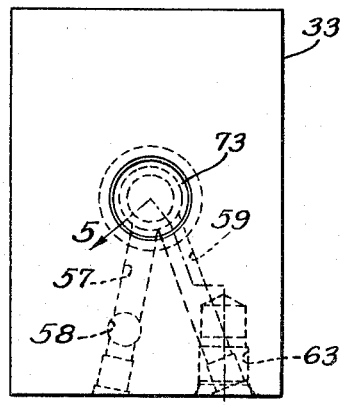
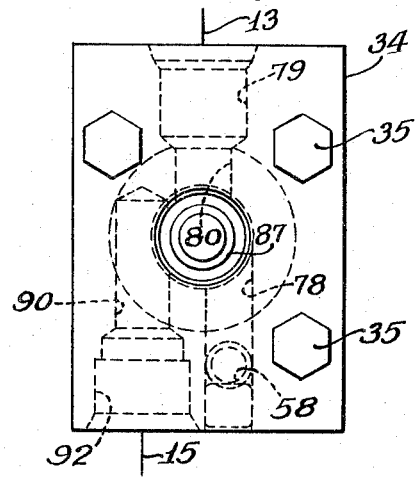
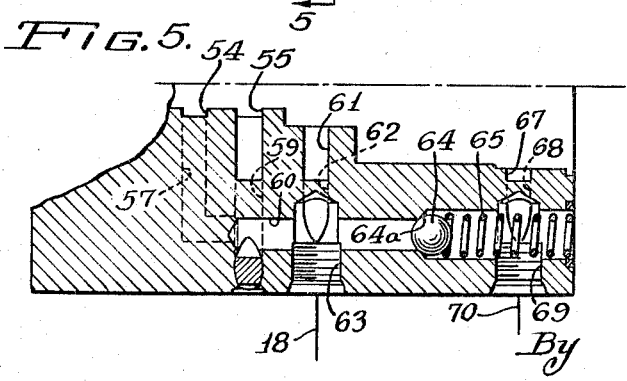
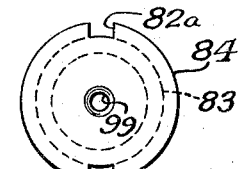

3,320,967
ACTUATOR VALVE MECHANISM
George T. Fiala, Downers Grove, and Donald W. Moyer, Chicago, Ill., assignors to International Harvester Company, Chicago, Ill., a corporation of Delaware
Filed May 21, 1964, Ser. No. 369,148
9 Claims. (Cl. 137—101)

This invention relates to a hydraulic systems but more particularly it is concerned with valving means for dividing flow in such systems.

In hydraulic systems employing primary and secondary circuits and wherein a single pump is utilized to pressurize both such circuits it is customary to provide some means for dividing fluid flow when and as required between these circuits. Generally such means takes the form of a flow-dividing valve mechanism employed in cooperation with an accumulator device incorporated in one of a plurality of these constant pressure circuits associated therewith and it is to this particular type of mechanism that the present invention is more specifically directed.

It is an important object, therefore, of the present invention to provide an improved and novel valve mechanism operable for dividing fluid flow from a common source and directing said fluid flow a limited portion of the time to a plurality of hydraulically actuated devices.

Another object is to provide a valve mechanism having pressure regulating means therein operable for actuating a flow dividing means portion thereof only when charging a secondary constant pressure circuit associated therewith but wherein a primary circuit associated therewith receives full fluid flow the greatest portion of the time.

A further object is to provide an improved actuator valving mechanism having flow-dividing means for directing fluid under pressure from a common source to a plurality of using units, and pressure regulating means operable to automatically cut in and out the flow-dividing means whereby fluid pressure is selectively directed either to one using unit or to a plurality of using units.

A still further object is to provide actuator valving mechanism including a pressure regulator valve and a flow divider valve and wherein said pressure regulator is automatically operative to actuate said flow divider valve for effecting a division of fluid flow from a common source to a plurality of hydraulic circuits responsive to a drop in pressure, below a predetermined minimum in one of the circuits thereof, and wherein one of said circuits is operative at a high pressure while the other of said circuits is operative at a considerably lower pressure.

Another important object is to provide actuator valving mechanism having a pressure regulator valve and a flow divider valve therein wherein said pressure regulator valve is normally disposed for maintaining the flow divider valve functioning to provide full flow to a primary circuit but being operative responsive to a decrease in pressure in a secondary circuit below a predetermined minimum for actuating said flow divider valve for effecting a division of flow from a common source to both said primary and secondary circuits.

Other objects and advantages will be understood and will become more apparent from the following description when read in conjunction with the accompanying drawings in which:

FIGURE 1 is a schematic diagram of a hydraulic system wherein the proposed invention has been incorporated;

FIGURE 2 is a longitudinal vertical sectional view of the proposed actuator valve mechanism of the present invention;

FIGURE 3 is an end elevational view of the proposed actuator valve mechanism;

FIGURE 4 is an end elevational view of the proposed valve taken from the end opposite that of the preceding view;

FIGURE 5 is a fragmentary, vertical and longitudinal sectional view taken generally along the line 5—5 of FIGURE 3; and FIGURE 6 is an end elevational view of the flow divider valve member.

Referring now to the drawings it will be seen that the invention has been illustrated in association with a conventional hydraulic system including primary and secondary circuits therein, with the primary circuit embracing a torque converter device and the secondary circuit including the hydraulically actuated clutching mechanisms of the torque converter. A hydraulic pump 10 has the inlet side thereof connected by a conduit 11 to a reservoir 12 while the outlet of said pump is connected by a conduit 13 with an inlet port of an actuator valve mechanism indicated generally by the reference numeral 14. It will be understood, of course, suitable power means (not shown) will be provided for motivating or driving said pump. An outlet or work port of said actuator valve is connected by a conduit 15 with the inlet of a torque converter indicated generally at 16 while the outlet or return of said converter is connected by a conduit 17 to reservoir 12. Another outlet or work port of actuator valve 14 is connected by conduit 18 to a starting valve 19 which is connected by conduit 20 to reservoir 12 and by conduit 21 to a transmission disengage valve 22, while a branch conduit 23 extending from conduit 21 connects with an accumulator device 24. Valve 22 is connected by conduit 25 to reservoir 12 and by conduit 26 to a selector valve 27, which latter valve is connected by way of conduit 28 with reservoir 12 and by way of conduit 29 with a forwardly driving hydraulically actuated clutch 30, and by way of conduit 31 with a reverse driving hydraulically actuated clutch 32. Since all of these components, except the actuator valve mechanism, are conventional and the operation of which are well known it was felt no further description or explanation of the structural details thereof would be necessary herein.

The actuator valve 14, as illustrated, may include a two-part casing or housing comprising a first portion 33 and a second portion 34 fixedly secured to one another by suitable fastening means such as the bolts or cap screws 35. First casing portion 33 has a central longitudinally extending bore 36 therein that slidably receives a spool member 37 and one end of said bore opens into an enlarged counterbore 38 while the latter, in turn, opens into a further enlarged counterbore 39. The opposite end of bore 36 opens into a slightly enlarged counterbore 40. Positioned within bore 38 is a sleeve-like actuator rod member 41 having an annular rib 42 extending outwardly therefrom that is circumferentially dimensioned to slidably fit within the latter bore and is fashioned with spaced-apart inclined faces 42a, 42b. A transversely extending pin 43 passed through spool 37 and said actuator member functions to constrain these elements for movement with one another. Positioned within bore 39 in a tight-fitting relationship is a sleeve-like closure member 44 with a bore 45 therein dimensioned to slidably receive one end of actuator member 41, and having an aperture 46 through one end of the closure member that slidably accommodates one end of spool 37. An additionally enlarged counterbore 47 extending inwardly from one end of casing portion 33 provides an annular passage area 48 circumscribing one end portion of the member 44. Liquid sealing rings 49, 50 may be provided to restrict fluid flow along opposite longitudinal faces of said closure member 44. Positioned within sleeve actuator 41 is a coil spring 51 that abutts at one end against said actuator and at the other end against the end wall of closure member 44. An annular recess 52 at one end of bore 45 accommodates a garter spring 53 that encircles sleeve actuator 41 and normally rests against an inclined face 42a of the rib 42 of said sleeve actuator to provide detent means for a purpose which will be subsequently explained.

Annular recesses 54 and 55 provided in bore 36 proximate one end thereof are communicatively connected by an axially-extending annular passage 56 formed by a groove 56a fashioned in spool 37. Recess 54 additionally communicates with a vertically-extending passage 57 which, in turn, opens into a longitudinally-extending passage 58, while recess 55 communicates with a vertically-extending passage 59 which, in turn, opens into a longitudinally-extending passage 60. An annular area or chamber 61 provided between an end portion of sleeve actuator 41 and counterbore 38 communicates with a vertical passage 62 that opens into passage 60 and into an outlet or work port opening 63 which communicatively connects with conduit 18. The opposite end of passage 60 is slightly enlarged and accommodates a ball member 64 which is normally held seated against the chamfered end 64a of passage 60 by means of a coil spring 65 to provide relief or safety valve means for the circuit connected to port opening 63. The annular area 48 adjacent one end of member 44 communicates by way of radial passage 66 with a chamber 67 disposed within bore 45 between the end of sleeve actuator member 41 and the end wall of closure member 44, while said chamber, in turn, communicates by way of a radially-extending passage 68 with passage 60 and with a sump or reservoir port opening 69 which opens thereinto and is communicatively connected by way of conduit 70 with reservoir 12. This provides for the drainage of fluid that may occasionally leak along the walls of members 41 and 44 back into reservoir 12.

A longitudinal passage 71 extending inwardly from one end face of casing portion 33 connects at its opposite end with a vertically extending passage 72 which opens into bore 40 proximate the end of spool 37. A closure plug assembly 73 fitted into the open end of bore 40 may be affixed therein by suitable fastening means such as the snap ring 74.

Liquid sealing rings 75, 76 and 77 disposed at points axially spaced along the spool member 37 provide means for restricting the flow of fluids therealong all as is well understood.

The casing portion 34 is fashioned with a central longitudinally extending bore 36a which, when the two casing portions are juxtaposed, is coaxial with although somewhat larger in diameter than the bore 36 in first casing portion 33. A longitudinal passage is disposed for coaxial positioning with and represents an extension of passage 58, while a passage 71a is coaxial with and represents an extension of passage 71 in said first casing portion. Passage 58 connects in casing portion 34 with a vertically-extending passage 78 which opens into bore 36a while passage 71a connects with an inlet port opening 79 which communicatively connects with inlet pressure conduit 13. Inlet port opening 79 also connects by way of passage 80 with the interior of bore 36a, while an annular recess 81 fashioned in said bore also opens into the interior thereof.

Slidably positioned within bore 36a in casing portion 34 is a sleeve-like flow-divider valve member 82 fashioned with an annular groove portion 83 proximate a closed end thereof and having axially extending and diametrically spaced slots 83a, 83b, extending from said groove and which latter end as disposed cooperates with bore 36a to provide an annular chamber area 84 therebetween. The closed end of valve member 82 seatingly receives one end of a coil spring 85 the opposite end of which rests in a cup 86 fashioned as part of a closure plug 87 affixed in position in the outer end of bore 36a by suitable means such as the snap ring 88. A suitable liquid seal 89 may also be used with said closure plug as is well understood. A vertically-extending passage 90 opens at one end into annular recess 81 while the opposite end of said passage opens into a fluid outlet or work port opening 92 which is communicatively connected by conduit 15 with the primary circuit. An outwardly opening annular recess 93 in the outer surface of valve member 82 communicates by means of a small radially-extending passage 94 with the interior area 95 of said valve member. Suitable sealing means such as indicated at 96, 97 and 98 may be provided to prevent leakage where coextensive passages of the two casing portions are joined as is well understood. The closed end of valve member 82 is provided with a small axially extending opening 99 which functions as an orifice for metering fluid therethrough as will subsequently be more fully explained, and a transversely extending slot 100 in the end of spool 37 is disposed opposite and in registry with said orifice.

*Operation*

Assume for purposes of explanation that the work or outlet port 92 connects with a primary hydraulic circuit that requires a high pressure, in the order of 1500 p.s.i. or the like, such as might be required in a torque converter transmission of a vehicle, while the work or outlet port 63 connects into a secondary hydraulic circuit requiring only a low pressure, in the order of 200 p.s.i., such as might be required for operating the clutches associated with said torque converter. Other applications of the actuator mechanism, by way of example, might involve a high pressure primary circuit having a lifting bucket for an earth-moving vehicle therein, and with a secondary circuit requiring only sufficient pressure to tilt the bucket, or vice versa with various combinations of high and low pressure in the primary and secondary circuits.

As illustrated in FIGURE 2, the position of the components of the mechanism are such that fluid flow from the fluid pressure source through the actuator valving mechanism is cut-off or blocked. Assume now that fluid flow is desired in the primary circuit which connects by way of conduit 15 with outlet port opening 92, in which case fluid pressure entering the valve from pump 10 is directed through inlet port opening 79, passage 80 and annular area 84 where it reacts against an inclined surface 101 of valve member 82 thereby forcibly sliding said member to the right (as seen in FIGURE 2) against the reaction of spring 85. Attendant to this movement the peripheral edge of surface 101 clears the proximate edge of annular recess 81 and permits fluid flow from the area or chamber 84 into annular recess 81 and interconnected passage 90 from whence it passes through the work or outlet port opening 92 and is delivered by way of conduit 15 to an associated hydraulic device, such as the torque converter 16 illustrated herein, in the primary circuit.

As soon as flow-divider valve member 82 moves away from the end of spool 37 a limited or metered amount of fluid becomes free to flow from chamber 84 through slots 83a, 83b and orifice 99, chamber 95, passages 78, 58 and 57 into annular recess 54. From the latter recess this metered flow passes by way of annular axial passage 56 into annular recess 55 thence through passages 59 and 60 out through the work port opening 63 and thereafter by way of conduit 18 to the secondary circuit and selectively to the hydraulic clutches 30 or 32. If, at this time, the pressure in the secondary circuit is below that at which it is prescribed it be operated, fluid under pressure will flow into the accumulator 24 and build up the pressure therein until the prescribed pressure is attained. At this time the metered fluid will then flow by way of passage 62 into the annular recess or chamber 61 behind actuator member 41 whereupon the pressure developed therein when supplemented by pressure against the end of spool 37, which connects by way of passages 72 and 71 with inlet port opening 79, will cause said actuator valve member to move to the right overriding the resistance of detent garter spring 53. Normally garter spring 53 cooperates with spring 51 to maintain the actuator valve member to the left against the pressure on the end of spool 37 and against a pressure of less than the 200 p.s.i. required in the secondary circuit. As actuator valve member 41 moves rightwardly it carries with it spool 37 thereby causing said spool to cut off or block the flow of fluid by way of passage 56 into annular recess 55. With this passage blocked flow to port opening 63 from the fluid pressure source is also blocked and full flow to work port opening 92 is resumed. Actually, during the time there was fluid flow from the common source to both the primary and secondary circuits there was only a small metered flow through orifice 99 to the secondary circuit.

It will be seen that when spool 37 is moved rightwardly (as viewed in FIGURE 2) the right end thereof will extend outwardly beyond the end of closure member 44 and into bore 36a. In this position fluid flow from chamber 84 may pass through slots 83a, 83b in member 82, and through slot 100 in spool 37, and thereafter through orifice 99 into area 95 and passages 78, 58 and 57 so as to maintain annular recess 54 under prespressure. Now when the pressure in the secondary circuit drops below the pressure prescribed therefore the pressure in chamber 61, interconnected by way of passage 62 and port 63 with said circuit, will decrease sufficiently to permit spring 51 to override the effect of such decreased pressure on actuator member 41. When this occurs actuator member 41 will move leftwardly carrying with it spool 37 thus causing said spool to open up flow from annular recess 54, presently under pressure, through passage 56 annular recess 55, passages 59 and 60 and into port opening 63 and the secondary circuit for recharging of the accumulator therein.

In the event the pressure in the secondary circuit should rise above that prescribed therefor the excess pressure will cause the ball valve 64 to be unseated and thereby vent this circuit by way of sump port opening 69 and conduit 70 into reservoir 12. When the excess pressure has been reduced spring 65 will again reseat ball valve 64 on its seat 64a.

If the valve member 82 should move far enough to the right to completely close off the passage 78 from communication with the area 95 interiorly of said valve member communication will be reestablished by way of annular recess 93 and the small diametered radially-extending passage 94.

It will be apparent from the above that the proposed invention will permit the use of a smaller capacity pump, since a limited or metered flow is provided for the secondary circuit for a limited time only thus permitting the primary circuit to receive the full pump output the greater portion of the time. It will also be obvious that the proposed valve mechanism provides an automatically operated flow dividing valve means which is operative responsive to a decrease in pressure in the secondary circuit below a predetermined minimum therein.

While only one form of the invention has been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passages between said first valve means and each of said inlet and first port openings; means normally urging said first valve means to a closing position whereat fluid flow between said inlet and first port openings is interrupted, but being operative responsive to fluid pressure in said inlet port for opening said fluid valve means and establishing fluid flow communication between said inlet and first port openings; second valving means in said housing structure; means forming passages communicatively connecting said second valving means with said second outlet port and with said inlet port; said latter means including a metered flow passage through said first valving means; actuator means connected to said second valving means; means forming a passage communicatively connecting said actuator means to said second outlet port, said actuator means being operative responsive to a drop in pressure below a predetermined minimum in said second outlet port for actuating said second valving means for establishing limited fluid flow between said inlet port and said second outlet port while continuing fluid flow from said inlet port to said first outlet port.

2. A flow divider valve mechanism, comprising: a body member having a plurality of port openings therein and a centrally disposed bore formed therein; a first one of said port openings being adapted for fluid flow communication with a source of fluid pressure, a second port opening being adapted for fluid flow communication with a primary hydraulic circuit, a third port opening being adapted for fluid flow communication with a secondary hydraulic circuit, and a fourth port opening being adapted for fluid communication with a fluid reservoir; first valve means including a first sleeve-like member having one end wall therein fashioned with a small diametered opening axially therethrough and being reciprocably mounted in said bore; means formed in said body providing fluid passages between said first valve means and each of said first and second port openings; resilient means reactive between said body and said sleeve-like member normally urging said first valve means to a closing position whereat fluid flow between said first and second port openings is interrupted, but being operative responsive to fluid pressure in said first port opening for opening said first valve means and establishing fluid flow communication between said first and second port openings; second valve means in said body operable between an opened and a closed position, and actuator means operable for actuating said second valve means; means forming in said body passages communicatively connecting said second valve means with said third and first port openings, and having a portion of the latter passage including said small diametered axially extending opening in said first valve means; said second valve means including a spool reciprocable in a portion of the bore in said body; additional means in said body forming a passage extending between said first port opening and an end of said spool whereby fluid pressure in said first port opening is exerted on an end of said spool; said actuator means including a second sleeve-like member having one end wall therein with an opening therethrough for accommodating said spool therein and being reciprocably mounted in a portion of the bore of said body; means connecting said second sleeve member and said spool for axial movement with one another; means in said body forming a passage communicating said third port opening with said end wall portion of said second sleeve-like member whereby fluid pressure in said latter port is exerted on said actuator means to assist in the movement thereof; resilient means reactive between said second sleeve-like member and said body for urging said actuator means in a direction opposing the force of the pressure exerted on an end of said spool and against the pressure exerted against the end wall area portion of said second sleeve-like member whereby said second valve means is opened to permit limited fluid flow between said first port opening and said third port opening when the pressure in said latter port opening is below a predetermined minimum, but having said actuator means operative to permit movement thereof in an opposite direction to close said second valve means when the pressure in said third port opening rises above a predetermined amount.

3. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passage between said first valve means and each of said inlet and first port openings; means normally urging said first valve means to a closing position whereat fluid flow between said inlet and first port openings is interrupted, but being operative responsive to fluid pressure in said inlet port for opening said first valve means and establishing fluid flow communication between said inlet and first port openings; second valve means in said housing structure; means forming passages communicatively connecting said second valving means with said second outlet port and with said inlet port and including a passage formed in part through said first valving means; additional means forming a passage interconnecting said inlet port with said second valving means; actuator means connected to said second valving means; means forming a passage communicatively connecting said actuator means to said second outlet port; resilient means urging said actuator means to position such that when the pressure in said second outlet port falls below a predetermined minimum said second valving means is opened to establish limited fluid flow from said inlet port to said second outlet port while continuing fluid communication between said inlet port and said first outlet port; said actuator means being arranged so that fluid pressure in said additional passage means is cooperative with fluid pressure in said second outlet port when pressure in said latter port is above a predetermined amount for overriding the resistance of said resilient means and operating said actuator means for closing said second valving means and interrupting fluid communication between said inlet port and said second outlet port.

4. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passages between said first valve means and each of said inlet and first port openings; means normally urging said first valve means to a closing position whereat fluid flow between said inlet and first port openings is interrupted, but being operative responsive to fluid pressure in said inlet port for opening said first valve means and establishing fluid flow communication between said inlet and first port openings; second valving means in said housing structure; means forming passages communicatively connecting said second valving means with said second outlet port and with said inlet port and including a passage formed in part through said first valving means; additional means forming a passage interconnecting said inlet port with said second valving means; actuator means connected to said second valving means; means forming a passage communicatively connecting said actuator means to said second outlet port; yieldable detent means reactive between said actuator means and said housing structure; resilient means reactive between said actuator means and said housing structure; said resilient means being cooperative with said detent means for urging said actuator means into position such that when the pressure in said second outlet port falls below a predetermined minimum said second valving means is moved to an open position to establish limited fluid flow from said inlet port to said second outlet port without interrupting fluid communication between said inlet port and said first outlet port; and having said actuator means disposed so that fluid pressure in said additional passage means is cooperative with fluid pressure in said second outlet port when pressure in said latter port is above a predetermined value for overriding the resistance of said resilient means and said detent means and operating said actuator means for closing said second valving means and interrupting fluid communication between said inlet port and said second outlet port.

5. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passages between said first valve means and each of said inlet and first port openings; means normally urging said first valve means to a closing position whereat fluid flow between said inlet and first port openings is interrupted, but being operative responsive to fluid pressure in said inlet port for opening said first valve means and establishing fluid flow communication between said inlet and first port openings; regulator valve means in said housing, including a second valve means operable between an opened and closed position, and actuator means connected thereto and operable for actuating said second valve means; means forming passages communicatively connecting said second valve means with said second outlet port and with said inlet port and having a portion of the latter passage formed in said first valve means; said second valve means including a spool reciprocal in a bore provided in said housing; additional means forming a passage extending between said inlet port and an end of said spool whereby pressure in said inlet port is exerted on an end of said spool; means forming a passage communicatively connecting a portion of said actuator means with said second outlet port; resilient means urging said actuator means in one direction against the force of the pressure exerted on an end of said valve spool and against the pressure in said second outlet port whereby said second valve is opened to permit limited fluid flow between said inlet port and said second outlet port when the pressure in said second outlet port falls below a predetermined minimum, but being operative to permit movement of said actuator means in an opposite direction to close said second valve means when the pressure in said second outlet port rises above a predetermined amount.

6. In a hydraulic system having a first circuit portion with a first hydraulically actuated device therein, a second circuit portion having a second hydraulically actuated device and an accumulator communicatively interconnected with said second hydraulic device therein, a fluid reservoir and a source of fluid pressure, a flow divider valve mechanism, comprising: a body structure having an inlet port and a plurality of outlet port openings therein; said inlet port being adapted for fluid flow connection with said source; a first one of said outlet ports being adapted for fluid flow communication with said first circuit, a second one of said outlet ports being adapted for fluid flow communication with said second circuit and a third one of said outlet ports being adapted for fluid flow communication with said reservoir; flow divider valve means in said body structure and operative between an open and closed position; means formed in said body structure providing passages communicatively connecting said valve means with said inlet port and said first outlet port; resilient means normally urging said flow divider valve means to a closed position whereat fluid flow between said source and said first circuit is interrupted, but being operative responsive to pressure in said inlet port opening for actuating said flow divider valve means and establishing fluid flow communication between said source and said first circuit; regulator valve means in said body, including a first valve means operable between an opened and closed position, and an actuator means connected to said latter valve means for movement therewith and operable for actuating said first valve means; means in said body structure forming passages communicatively connecting said first valve means with said second outlet port and with said inlet port and having a portion of the latter passage formed in said flow divider valve means; additional means forming a passage interconnecting said inlet port with said first valve means; means in said body structure forming a passage communicatively connecting said actuator means with said second outlet port; yieldable detent means reactive between said actuator means and said body structure; resilient means reactive between said actuator means and said body structure; said resilient means being cooperative with said detent means for urging said actuator means into position such that when the pressure in said second outlet port falls below a predetermined minimum said first valve means is opened and limited fluid flow is established from said inlet port through said flow divider valve means to said second outlet port without interrupting fluid communication between said source and said first circuit; and further having said actuator means arranged so that fluid pressure in said additional passage means cooperates with fluid pressure in said second outlet port when pressure in said latter port is above a predetermined value for overriding the resistance of said resilient means and said detent means and operating said actuator means for closing said first valve means and interrupting fluid communication between said source and said second circuit.

7. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passages between said first valve means and each of said inlet and first port openings; means normally urging said first valve means to a closing position whereat fluid flow between said inlet and first port openings is interrupted, but being operative responsive to fluid pressure in said inlet port for opening said first valve means and establishing fluid flow communication between said inlet and first port openings; regulator valve means in said housing, including a second valve means operable between an opened and closed position, and actuator means connected thereto and operable for actuating said second valve means; means forming passages communicatively connecting said second valve means with said second outlet port and with said inlet port and having a portion of the latter passage formed in said first valve means; said second valve means including a spool reciprocal in a bore provided in said housing; additional means forming a passage extending between said inlet port and an end of said spool whereby pressure in said inlet port is exerted on an end of said spool; means forming a passage communicatively connecting a portion of said actuator means with said second outlet port; resilient means urging said actuator means in one direction against the force of the pressure exerted on an end of said valve spool and against the pressure in said second outlet port whereby said second valve is opened to permit limited fluid flow between said inlet port and said second outlet port when the pressure in said second outlet port falls below a predetermined minimum, but being operative to permit movement of said actuator means in an opposite direction to close said second valve means when the pressure in said second outlet port rises above a predetermined amount; means forming a passage in said housing structure communicatively interconnecting said second and said third outlet ports; and safety valve means disposed in said latter passage and operative for venting the said second outlet to a reservoir when the pressure in said latter port exceeds a predetermined maximum amount.

8. The structure described in claim 5 and further characterized in that when fluid flow is established between said inlet port and said first outlet port the passage communicatively interconnecting said second outlet port and said inlet port includes a slotted recess formed in an end portion of said second valve spool opposite the end thereof that communicates by said additional passage means with said inlet port.

9. A flow divider valve mechanism comprising: a housing structure having one inlet port opening and a plurality of outlet port openings therein; said inlet port being adapted for fluid communication with a source of fluid pressure, a first one of said outlet port openings being adapted for fluid communication with a primary hydraulic circuit, a second one of said outlet port openings being adapted for fluid communication with a secondary hydraulic circuit and a third one of said outlet port openings being adapted for fluid communication with a fluid reservoir; first valve means in said housing structure; means providing fluid passages between said first valve means and each of said inlet and first port openings; means normally urging said first valve means to a closing position whereat fluid flow between said inlet and first port openings is interrupted, but being operative responsive to fluid pressure in said inlet port for opening said first valve means and establishing fluid flow communication between said inlet and first port openings; regulator valve means in said housing, including a second valve means operable between an opened and closed position, and actuator means connected thereto and operable for actuating said second valve means; means forming passages communicatively connecting said second valve means with said second outlet port and with said inlet port and having a portion of the latter passage formed in said first valve means, said second valve means including a spool reciprocable in a bore provided in said housing; additional means forming a passage extending between said inlet port and an end of said spool whereby pressure in said inlet port is exerted on an end of said spool; said actuator means including a sleeve-like member reciprocable in an enlarged portion of the bore provided in said housing structure and having an end surface portion therefrom for receiving fluid pressure thereagainst; means forming a passage communicating said second outlet port with said end surface portion whereby fluid pressure in said latter port is exertable on said actuator means to assist in the movement thereof; resilient means reactive between said sleeve-like member and said housing structure for urging said actuator means in a direction opposing the force of the pressure exerted on an end of said spool and against the pressure exerted against the end surface portion of said actuator member whereby said second valve is opened to permit limited fluid flow between said inlet port and said second outlet port when the pressure in said latter port is below a predetermined minimum, but being operative to permit movement of said actuator means in an opposite direction to close said second valve means when the pressure in said second outlet port rises above a predetermined amount.

References Cited by the Examiner

UNITED STATES PATENTS

| | | | |
|---|---|---|---|
| 2,995,141 | 8/1961 | Hipp | 137—101 |
| 3,125,110 | 3/1964 | Allen et al. | 137—101 |
| 3,200,830 | 8/1965 | Moyer et al. | 137—101 |

WILLIAM F. O'DEA, *Primary Examiner.*

D. R. DONOVAN, *Assistant Examiner.*